Patented Feb. 20, 1951

2,542,771

UNITED STATES PATENT OFFICE 2,542,771

REACTION OF POLYMERIC MATERIALS WITH ETHYLENE

William E. Hanford, Short Hills, N. J., and John R. Roland, Wilmington, Del., assignors to E. I. du Pont de Nemours & Company, Wilmington, Del., a corporation of Delaware No Drawing. Application April 16, 1947, Serial No. 741,940

14 Claims. (Cl. 260—17)

This invention relates to processes for modifying polymers. It also relates to new polymeric products, and more specifically to ethylene-modified polymers and their preparation. The new products of this invention are not to be confused with copolymers of ethylene, which, as has been disclosed heretofore, may be produced by a variety of methods unlike the method for preparing ethylene-modified polymers hereinafter described. The new products of this invention are prepared by treatment of pre-existing polymers, natural or synthetic, with ethylene in the presence of a polymerization catalyst. This application is a continuation-in-part of our copending application S. N. 554,148, filed September 14, 1944, now abandoned.

An object of this invention is to provide a novel method for modifying natural and synthetic polymeric materials. Another object is to provide a method for improving the moisture resistance, and decreasing the water-absorbing tendency, of such polymers. A still further object is to provide novel modified polymeric compositions having a wide variety of useful properties. Still other objects will appear hereinafter.

These objects are accomplished in accordance with the invention, by reacting natural or synthetic polymers with ethylene. Accordingly, the invention comprises ethylene-modified polymers and a process for modifying natural and synthetic polymers by heating with ethylene under pressure in the presence of a free-radical producing compound as a catalyst. By "free-radical producing compound" is meant that the compound is capable of generating free radicals under the reaction conditions.

The products of this invention differ from copolymers, which contain linearly recurring units of all monomers used in their preparation. The new products contain chemically combined ethylene, and possess properties differing from those of the pre-existing polymer, from polyethylene, and from a corresponding ethylene copolymer. Furthermore, the ethylene, after reaction in the presence of the pre-existing polymer, cannot be separated therefrom by chemical or physical methods.

Inasmuch as ethylene is a gas at normal temperature and pressure, this invention requires suitable apparatus for gas phase reactions. This includes means for compressing ethylene, pressure-resistant reaction vessels and means for heating and agitating such reaction vessels. The polymer to be modified may be submitted to ethylene treatment in block form or better in thin films or fibers or still better in emulsion or solution. In practicing one of the embodiments of this invention, a suitable reaction vessel is charged with an emulsion or solution of the polymer and the polymer is thereafter treated with ethylene under certain controlled conditions described below. This charging operation is usually conducted under a blanket of deoxygenated nitrogen, or other inert gas, to exclude oxygen. Alternatively, the solution or suspension may be added to an evacuated reaction vessel by means of a loading lock. A free-radical producing compound, which may be an organic or inorganic peroxide, or other compound as hereinafter disclosed, is included in the reaction charge as a catalyst. The reaction vessel is then placed in a shaker machine provided with means for heating the vessel. Connection is established with a high pressure source of ethylene, and appropriate recording and controlling thermocouples are placed in position. The vessel is pressured with ethylene and heating and agitation are started. The course of the reaction may be followed by the pressure drop due to utilization of ethylene. The reaction rate is conveniently maintained by keeping the ethylene pressure within a designated pressure range. This is accomplished by a periodic injection of fresh ethylene, or by periodic injection of an inert solvent. The end of the reaction is marked by the cessation of ethylene absorption, after which the reaction vessel is cooled, bled of excess ethylene, opened, and emptied. The modified polymer may be readily separated from the reaction mixture by methods described in the following examples or by equivalents or simple modifications thereof readily apparent to one skilled in the art.

The following examples illustrate the scope of the process of this invention, and demonstrate operable ranges of reaction variables. The reaction vessel employed in these experiments is a 400 cc. pressure resistant vessel. All parts are given as parts by weight in c. g. s. units unless otherwise specified.

*Example 1.*—A silver-lined high-pressure reaction vessel is charged with 100 parts of a 33% emulsion of vinylidene chloride polymer, prepared as described hereinafter, and 0.2 part of benzoyl peroxide. The pH of this mixture is 1.7. The vessel is placed in a heated shaker machine, pressured with ethylene, and heating and agitation are started. During a reaction time of 10.5 hours throughout which the temperature is maintained at 73° to 76° C. and the pressure at 880 to 1000 atmospheres, there is a total observed pressure drop of 125 atmospheres. The vessel is then cooled, opened, and the reaction mixture discharged. This reaction mixture is then treated with 15 parts by volume of a 10% solution of aluminum sulfate to coagulate the polymer. The polymer is filtered and washed with water until free of emulsifier. The washed polymer is dried at 70° C. and there is obtained 20.9 parts of dry polymer. This softens on a Block Macquenne at 180° to 185° C. and contains 63.54% chlorine. From this it may be calculated that the ethylene-modified polymer contains an average of 1 ethylene unit for each 1.9 units of vinylidene chloride. The polymer can be molded under pressure at 190° to 200° C. with short heating cycles, whereas polyvinylidene chloride is extremely difficult, if not impossible, to mold.

The emulsion of polyvinylidene chloride used in the above experiment is prepared as follows: A pressure vessel is charged with 125 parts of oxygen-free water, 67 parts of vinylidene chloride, 11.4 parts of a 35% solution of a sodium salt of a secondary alkane sulfonic acid and 1 part of potassium persulfate. The vessel is purged of air by sweeping with a stream of deoxygenated nitrogen, closed and placed in an agitating rack in a thermostat maintained at 50° C. The vessel and contents are then heated for a period of 24 hours. A 20% aliquot of the reaction mixture is coagulated by the addition of a small amount of 10% aluminum sulfate solution. The polymer is filtered, washed free of soap and dried. This yields 14 parts of polyvinylidene chloride and indicates complete polymerization of the vinylidene chloride.

*Example 2.*—A stainless steel-lined pressure-resistant vessel is charged with a solution of 35 parts of cellulose acetate in 230 parts of 1,4-dioxane and 0.2 part of benzoyl peroxide. The cellulose acetate contains 53.43% of combined acetic acid. The vessel is closed, placed in a shaker machine, pressured with ethylene, and heating and agitation are started. During a reaction time of 16 hours, throughout which the pressure is maintained at 850 to 960 atmospheres and the temperature at 79° to 83° C., there is a total observed pressure drop of 490 atmospheres. The vessel is then cooled, bled of excess ethylene, opened, and the contents discharged. The reaction mixture is precipitated, by pouring as a thin stream, into two volumes of alcohol with vigorous stirring. The polymer thus obtained is filtered and dried. The dried polymer is then extracted with toluene in a continuous extractor. The soluble portion is an ethylene/dioxane wax which melts at 115° C. The insoluble portion is an ethylene-modified cellulose acetate which contains 52.5% of combined acetic acid. By comparison with the original cellulose acetate which contained 53.43% combined acetic acid, it may be calculated that an average of 0.24 unit of ethylene combined with each glucose unit of the cellulose acetate. Of this 0.04 mol of ethylene was positively identified as ethoxy groups, for the polymer contained 0.63% ethoxyl by analysis. The ethylene-modified cellulose acetate has a notably lower water absorption than the original cellulose acetate.

*Example 3.*—A stainless steel-lined pressure-resistant vessel is charged with a solution of 41.8 parts of polyvinyl alcohol formal in 208 parts of 1,4-dioxane and 0.2 part of benzoyl peroxide. The vessel is then closed, pressured with ethylene and heating and agitation are started. During a reaction period of 16 hours, throughout which the temperature is maintained at 78° to 86° C. and the pressure at 720 to 900 atmospheres, there is a total observed pressure drop of 760 atmospheres. The vessel is then cooled, bled of excess ethylene, opened and the contents discharged. The polymer is precipitated by pouring into alcohol, dried, and extracted with toluene. The toluene-soluble portion, amounting to 35 parts, is found to comprise an ethylene-modified polyvinyl alcohol formal. This ethylene-modified polymer contains 64.21% carbon and 8.87% hydrogen, which corresponds to an empirical formula of $C_{6.4}H_{10}O_2$. The original polyvinyl alcohol formal contained 58.06% carbon and 7.78% oxygen which corresponds to an empirical formula of $C_{4.5}H_{7.2}O_2$. The differences from whole numbers are attributable to the incomplete acetalization of the polyvinyl alcohol. The difference between these empirical formulas is $C_{1.9}H_{3.3}$. This indicates that an average of one ethylene reacted for each acetal unit of the polyvinyl alcohol formal. This ethylene-modified polymer is found to be considerably more resistant to organic solvents than the unmodified polyvinyl alcohol formal.

*Example 4.*—A stainless steel-lined, pressure-resistant vessel is charged with 100 parts of nonaethylene glycol and 0.3 part by volume of diethyl peroxide. The vessel is closed, placed in a heated shaker machine, pressured with ethylene, and heating and agitation are started. During a reaction time of 16.5 hours, throughout which the temperature is maintained at 127° to 131° C., except for a brief temperature surge to 151° C., and the pressure at 800 to 950 atmospheres there is a total observed pressure drop of 1115 atmospheres. The vessel is then cooled, bled of excess gas, opened and discharged. The reaction mixture is poured into a mixture of benzene and water to extract, respectively, the ethylene-modified polyglycol, a surface active product, and the unreacted nonaethylene glycol. A portion of concurrently formed ethylene polymer which does not dissolve in this mixture is filtered. The benzene layer of the filtrate is separated, dried and evaporated. There is thus obtained 21 parts of an ethylene-modified nonaethylene glycol which shows a high degree of surface activity in wetting sulfur and in deterging soiled fabrics. The water layer of the filtrate is evaporated and there is thereby recovered 91.4 parts of nonaethylene glycol. The ethylene-modified nonaethylene glycol contains 79.47% carbon and 12.8% hydrogen. From this it may be calculated that the ethylene-modified product contains 18.6% by weight of ethylene and that on an average 3.16 units of ethylene are combined with each molecule of nonaethylene glycol.

*Example 5.*—A stainless steel-lined, pressure-resistant vessel is charged with 0.2 part benzoyl peroxide and a solution of 35 parts of cellulose propionate in 230 parts of 1,4-dioxane. The cellulose propionate contains 59.79% combined propionic acid. The vessel is placed in a heated shaker machine, pressured with ethylene and heating and agitation are started. During a reaction time of 16 hours, throughout which the temperature is maintained at 77° to 81° C. and the pressure at 750 to 965 atmospheres, there is a total observed pressure drop of over 1000 atmospheres. The reaction is very vigorous and momentary temperature surges to as high as 150° C. are observed. The vessel is then cooled, bled of excess ethylene, opened and the reaction mixture discharged. The solid product is precipitated by pouring into methanol after which it is filtered and dried. The solid product is then extracted with boiling benzene to separate 14 parts of ethylene/dioxane wax. The insoluble polymer is found to comprise 30 parts of an ethylene-modified cellulose propionate. This contains 21.96% combined propionic acid. From this analysis and that of the original cellulose propionate it may be calculated that an average of 18.1 units of ethylene are combined with each glucose unit of the cellulose propionate. This modified cellulose propionate is found to be insoluble in cold acetone, xylene, acetone-xylene (50–50 by volume), ethanol, ethanol-xylene, (50–50 by volume), tetrachloroethylene, ethyl acetate, chloroform, dioxane, and dioxane-xylene (50–50 by volume). The ethylene-modified cellulose propionate is also substantially insoluble in these solvents at 80° C. Slight swelling, but no true dissolution, is observed in hot xylene. The original cellulose propionate is very sensitive to similar solvents in that it is either soluble in or highly swollen by them.

Similar treatment of ethyl cellulose effects a combination of about 1 unit of ethylene for each glucose unit of the ethyl cellulose.

*Example 6.*—A stainless steel-lined pressure-resistant vessel is charged with 100 parts of water, 0.2 part of benzoyl peroxide and a 6" x 12" film of methyl acrylate polymer, (about 7 parts). The film is supported on a rack in such a fashion as to prevent sagging and mechanical damage and to provide intimate contact with the remainder of the reaction mixture. The vessel is then closed, evacuated to remove air, placed in a heated shaker machine, pressured with ethylene and heating and agitation are started. During a reaction time of 8 hours, throughout which the temperature is maintained at 72° to 82° C. and the pressure to 850 to 960 atmospheres, there is a total observed pressure drop of 430 atmospheres. The vessel is then cooled, bled of excess ethylene, opened and the contents discharged. The reaction mixture is filtered and dried. The film of methyl acrylate polymer is covered with ethylene polymer. These are separated by dissolution of the former in boiling acetone in which solvent neither polyethylene nor ethylene/methyl acrylate copolymer is soluble. This ethylene-modified polymer is found to contain 57.6% carbon and 7.55% hydrogen from which it may be calculated that the polymer contains an average of 1 unit of ethylene combined for each 5 units of the methyl acrylate. This ethylene-modified polymer is stiffer than methyl acrylate polymer and has a lower water absorption.

*Example 7.*—A stainless steel-lined pressure-resistant vessel is charged with 100 parts of tertiary butyl alcohol, 20 parts of polyvinyl acetate (a commercial grade having a saponification number of 653) and 0.3 part by volume of diethyl peroxide. The vessel is closed, evacuated to remove air, placed in a heated shaker machine, pressured with ethylene, and heating and agitation are started. During a reaction time of 7.75 hours, throughout which the temperature is maintained at 128° to 137° C. and the pressure at 750 to 1000 atmospheres, except for a brief period of rapid reaction when it dropped to 550 atmospheres, there is a total observed pressure drop of 1500 atmospheres. The vessel is then cooled, bled of excess ethylene, opened and the contents discharged. The tertiary butyl alcohol is separated from the reaction mixture by evaporation in vacuum on a steam bath, and the solid residue is then extracted with alcohol and with toluene. The ethylene-modified polyvinyl acetate is obtained from these extracts by evaporation of the solvent. The alcohol extracted polymer is found to have a saponification number of 455.9. Compared with the saponification number of the original polyvinyl acetate of 653, these analyses show that an average of 1.4 units of ethylene combined with each vinyl acetate unit of the polymer.

*Example 8.*—A synthetic linear polyamide is prepared by reacting 35.5 parts of hexamethylenediammonium adipate, 26.5 parts of hexamethylenediammonium sebacate and 38 parts of caprolactam, as disclosed in U. S. Patent 2,285,009. Two hundred parts of a 15% solution of this polyamide in methanol-water (80/20 ratio by volume) and 0.5 part of benzoyl peroxide dissolved in 13.2 parts of pure benzene are charged into an autoclave. The autoclave is flushed with oxygen-free nitrogen and pressured with ethylene. The autoclave is heated to 80° C. and the pressure adjusted to between 800 and 900 atmospheres with ethylene, where it is maintained for 10.5 hours. During this period there is an observed pressure drop corresponding to 515 atmospheres of ethylene. On cooling, the reactor is opened and the product is removed as a white gel which is washed with acetone in a Waring Blendor. The product is then filtered and dried to give 51 parts of a white powder. A portion of this powder, amounting to 35.5 parts, is extracted in a Soxhlet apparatus for 72 hours with boiling toluene in order to remove any polyethylene that has not become chemically attached to the polyamide. The residue amounts to 25 parts and analysis shows that it corresponds to a product containing 28.5% of ethylene. The residue from the extraction is insoluble in boiling toluene which is a solvent for polyethylene and methanol-water mixtures which dissolve the polyamide. A hot pressed film of the modified polyamide is found to be more impermeable to the passage of water vapor than are control films of polyethylene and polyamide. The properties of the modified polyamide film in comparison with unmodified polyethylene and unmodified polyamide are tabulated below:

| Per Cent Ethylene | Tensile, lb./in.² | Per Cent Elongation | Modulus, lb./in.² | Water Vapor Permeability Parts of Water/100 sq. meters of mil film/hour |
|---|---|---|---|---|
| 0 | 9,675 | 480 | 35,000 | 5,280 |
| 28.5 | 2,510 | 213 | 61,000 | 1,300 |
| 100.0 | 2,200 | 600 | 23,000 | 116 |

*Example 9.*—Two hundred parts of a 15% solution of the polyamide of Example 8 in methanol-water (80–20 by volume) and 0.2 part of ditertiary butyl peroxide in 8 parts of methanol are charged into an autoclave. The autoclave is heated to 120° C. and pressured to between 800 and 900 atmospheres with ethylene. The pressure is maintained in this range for 10 hours. During this period there is a total observed pressure drop of 1040 atmospheres of ethylene. After this period of reaction the autoclave is allowed to cool and the contents discharged. The product, a white spongy gel, is washed with acetone in a Waring Blendor, leaving 80 parts of a fine white powder. A portion of this powder, amounting to 68.5 parts, is extracted for 96 hours with boiling toluene in a Soxhlet apparatus. There is obtained 39 parts of a material which by analysis corresponds to one containing 43.5% ethylene. The product is not soluble in boiling toluene which is a solvent for polyethylene and in methanol-water mixtures which dissolve the polyamide. The properties of the modified polyamide, in comparison with those of polyethylene and the unmodified polyamide, are tabulated below.

| Per Cent Ethylene | Tensile, lb./in.² | Per Cent Elongation | Modulus, lb./in.² | Water Vapor Permeability Parts of Water/100 sq. meters of mil film/hour |
|---|---|---|---|---|
| 0 | 9,675 | 480 | 35,000 | 5,280 |
| 43.5 | 2,143 | 520 | 31,000 | 1,360 |
| 100 | 2,200 | 600 | 23,000 | 116 |

*Example 10.*—A synthetic linear polyamide is prepared by reacting 35.5 parts of hexamethylenediammonium adipate, 26.5 parts of hexamethylenediammonium sebacate and 38 parts of caprolactam, as disclosed in U. S. 2,285,009. One-hundred parts of a 5% solution of this polyamide in methanol-water (80-20 by volume) and 0.2 part of di-t-butyl peroxide dissolved in 64 parts of methanol and 20 parts of water are charged into an autoclave. The autoclave is flushed with oxygen free nitrogen and pressured with ethylene. The autoclave is heated to 120° C. and the pressure adjusted to between 800-900 atmospheres with ethylene where it is maintained for 9 hours. During this period there is an observed pressure drop corresponding to 1,290 atmospheres of ethylene. On opening the autoclave there is found a good dispersion of polymer which shows some thixotropic properties. The particles of dispersed polymer appear perfectly spherical in shape under the microscope and for the most part are 2-3 microns in diameter. The dispersion contained 29.1% total polymer.

In the practice of this invention there may be used any linear polymer whether natural or synthetic. Examples of natural and modified natural polymers that may be employed are cellulose, silk, wool, and cellulose esters and ethers, e. g., nitrocellulose, cellulose acetate, cellulose propionate, methyl cellulose, ethyl cellulose, and cellulose glycolate. The synthetic polymers are those obtainable either by addition polymerization or by condensation polymerization. Of the synthetic polymers, it is preferred to use those which contain halogen or certain oxygenated groups, preferably ester, amide, or acetal groups. These groups may be lateral to the polymer chain, as in polyvinyl chloride, polyvinyl acetate, or integral therewith as in the polyesters and polyamides formed by condensation polymerization.

Examples of addition polymers are those obtainable from vinyl and vinylidene compounds. There are numerous substances of this type, and by way of example those which can be used in the practice of this invention include vinyl ester polymers (polyvinyl chloride, polyvinyl fluoride, polyvinyl bromide, polyvinyl acetate, and the like), polyvinylidene chloride, polyvinylidene fluoride, polyvinyl ethers, e. g., poly (methyl vinyl ether), etc., polymers of 1-chloro-1-fluoroethylene, vinyl chloride/vinyl carboxylate polymers, i. e., vinyl chloride/vinyl acetate polymers, alkyl polyacrylates and polyalkacrylates, etc.

Examples of linear condensation polymers that can be used are the synthetic linear polyamides, polyesters, polyesteramides, polyacetals, polyethers and polyanhydrides, of the general types described in U. S. Patent 2,071,250. Of these synthetic linear condensation polymers the polyamides are especially suitable. These are defined in U. S. 2,359,877 and are made as disclosed in U. S. Patents 2,071,253 and 2,130,948 by methods which comprise self-polymerization of a mono-aminomonocarboxylic acid and by reaction of essentially equimolar amounts of a dibasic acid with a diamine. Examples of such polyamides are polymerized aminocaproic acid, polyhexamethyleneadipamide and polyhexamethylenesebacamide. Polyamides containing heteroatoms as described in U. S. Patents 2,158,064 and 2,191,556 can also be used. The interpolyamides because of their good solubility characteristics, represent a valuable class of synthetic linear condensation polymers for use in the practice of this invention. Such interpolyamides are obtained by reacting together a plurality of polyamide-forming compositions, e. g., as described in U. S. Patents 2,252,554 and 2,252,555. An especially suitable interpolyamide because of its excellent solubility characteristics is that obtained by reacting together about 40% of hexamethylenediammonium adipate, 30% hexamethylenediammonium sebacate and 30% omega-aminocaproic acid as described in U. S. Patent 2,285,009.

The polyester-amides used in the practice of this invention are the high molecular weight linear condensation polymers described in U. S. Patents 2,071,250, 2,224,037 and 2,312,879. These polyester-amides are prepared for example, by reacting an omega-hydroxy acid with a diamine and a dibasic acid, by reacting an aminoalcohol with a dibasic acid, by reacting a glycol with a diamine and a dibasic acid, or by reacting a glycol with an aminoacid and a dibasic acid.

The polyesters used in the practice of this invention are the high molecular weight polymers described in U. S. Patent 2,071,250 and which are made by self-esterification of hydroxy acids, such as omega-hydroxydecanoic acid, or by reaction of a dibasic acid, e. g., suberic acid, with a dihydric alcohol, e. g., trimethylene glycol.

Still further types of polymers useful in the practice of this invention are the polyethers, polyanhydrides, and polyacetals described in the above-mentioned U. S. Patent 2,071,250 and the polyacetals described in U. S. Patent 2,071,252.

Examples of modified preformed synthetic polymers useful in the practice of this invention are the N-alkoxymethyl polyamides obtained by reacting at moderate temperature (25° to 75° C.) a formic acid solution of a polyamide with alcohol and formaldehyde, or by other methods described in the copending application of T. L. Cairns, Serial No. 539,195, filed June 7, 1944, now Patent No. 2,430,860, November 18, 1947, chlorinated polyethylenes such as disclosed in U. S. Patent 2,183,556 and the dehalogenated polyethylenes disclosed in U. S. Patent 2,261,757, polyvinyl formals, acetals, and butyrals formed by reacting either polyvinyl alcohol or a partially hydrolyzed polyvinyl ester with an aldehyde, e. g., formaldehyde, acetaldehyde, butyraldehyde, etc., polyvinyl alcohols obtained either by the partial or complete hydrolysis of polyvinyl carboxylates or copolymers containing vinyl carboxylate units.

Linear organic polymers, as above exemplified, are thus highly satisfactory starting materials in the practice of the invention. Linear polymers containing carbocyclic or heterocyclic rings in, or attached laterally to, the polymeric chain are also satisfactory.

The ethylene to be used in the practice of this invention should be relatively pure and it is usually desirable to have it free of oxygen and acetylene at least to the extent of not more than 1000 parts per million, generally to less than 500 parts per million and preferably to less than 100 parts per million. These very small amounts of oxygen may be catalytically active, especially in the absence of other polymerization catalysts. Thus, the ethylene should preferably be subjected to deoxygenation pretreatment, which, if desired, may be in accordance with the method described in U. S. Patent 2,351,167. The ethylene may contain small amounts of other contaminants which appear to be less deleterious for the reaction. These include, in small concentrations, carbon dioxide, carbon monoxide, propylene, propane, hydrogen and nitrogen. Ethylene from any commercial source may be used in the practice of this invention and since such ethylene usually contains contaminants it should be freed of such substances. For example, acetylene may be removed by absorption in a solvent, through the use of a scrubbing tower.

The temperature used in the practice of this invention usually is within the range of from about 30° to 400° C. The thermal degradation of polymers is often quite rapid but, in the practice of this invention the degradation appears to be completely eliminated or much minimized by conducting the heating in an atmosphere of ethylene. Although this degradation is much minimized even at the higher temperature ranges, it is usually preferred to conduct the process of the invention in the more restricted temperature range of 50° to 250° C. The actual temperature to be employed is dependent on the type of catalyst, and as noted hereinafter, on the chosen pressure range. Thus the organic and inorganic peroxy compounds, i. e., compounds containing the —O—O— group, are generally used in the temperature range from 50° to 150° C.; the oximes are generally operable at 100° to 225° C., and the hydrazine compounds, per halo compounds, azines, and positive halogen compounds at 150° to 300° C., preferably 200° to 300° C. As noted above, oxygen, in small concentrations, is a catalyst for the reaction, suitable temperatures being 200° to 300° C., preferably 200° to 250° C. These temperature ranges for the several classes of catalysts are for batch operation, and when the process is carried out in a continuous manner minor alterations, dependent on the contact time, are necessary. This correction usually requires a revision upwards from the limits given by about 25° to 50° C.

The process of this invention may be practiced at any ethylene pressure above atmospheric. However, at low pressures the ethylene concentration is quite low and the process is generally practiced at ethylene pressure from 50 to 1500 atmospheres and preferably at 500 to 1500 atmospheres, for largely by this means is a practically high ethylene concentration maintained. For preparing very highly modified polymers and for attaining high reaction rates even higher ethylene pressures, up to 3000 atmospheres, may be used. The temperatures and pressures used in the practice of this invention are interdependent variables and either must be determined with respect with respect to the other. For example, if low pressures are elected, relatively high temperatures are required. Conversely the use of higher pressures permits the employment of relatively low temperatures. Appropriate temperature-pressure combinations can be taken from the specific examples given or by simple modification thereof to effect different ratios of ethylene reacting or to obtain different reaction rates.

The modification of pre-existing polymers with ethylene may be conducted in any suitable reaction medium. For example, the reaction may be conducted with a solution of the polymer or with a dispersion of the polymer or with bulk forms of the polymer, preferably with thin forms such as films and fibers. The reaction medium may thus comprise any organic material which is a good solvent for the polymer or may comprise water with any of the well known dispersing or modifying agents, such as soaps, sodium alkyl sulfates, sodium alkanesulfonates, long chain ammonium salts, long chain betaines, and the like.

The free radical producing substances, which may be used in the practice of this invention, include the peroxy compounds, i. e., compounds which contain the —O—O— grouping, e. g., diacyl peroxides such as diacetyl peroxide, bibutyryl peroxide, dipropionyl peroxide, dilauroyl peroxide, dioleyl peroxide, dibenzoyl peroxide, benzoyl acetyl peroxide, and dialkyl peroxides such as dimethyl, diethyl, dipropyl, diisopropyl and dibutyl peroxides or per salts such as ammonium and alkali metal persulfates, perborates and percarbonates, etc. Other free radical forming substances which may be used include the azines, e. g., benzalazine, diphenylketazine, etc., hydrazines, e. g., hydrazine hydrochloride, dibenzoyl hydrazine, etc., oximes, e. g., acetoxime, camphoroxime, butyraldoxime, etc., amine oxides, e. g. trimethylamine oxide, etc., perhalo compounds, e. g., hexachloroethane and octachloropropane, etc., positive halogen compounds, e. g., sodio N-chloro-p-toluenesulfonamide, sodio N-chlorobenzene-sulfoneamide, 1,3-dichloro-5,5-dimethylhydantoin, etc. These catalysts do not catalyze the Friedel-Crafts reaction. The preferred catalysts are the peroxy compounds because they are active at low concentrations and do not require the use of excessively high temperatures. Friedel-Crafts type catalysts are not suitable in the practice of this invention.

The modified polymers prepared in accordance with this invention are characterized in that they contain ethylene units attached to the pre-existing polymeric chain. This is shown by analysis of the modified polymers, as illustrated in the examples. The mechanism of the reaction whereby such a result is obtained is not known with certainty, but it is believed to involve formation of a free radical from the pre-existing polymer, thus providing a point wherefrom a new polymer chain can grow. Regardless of the mechanism it is evident that the modified linear polymers in general contain substituent ethylene and/or polyethylene groups. In some instances such substituent groups may serve to cross-link two or more of the original polymer molecules.

It is usually desirable that the portions of the reactor in immediate contact with the reaction mixture be of materials which do not rapidly catalyze the decomposition of the peroxides or induce side reactions of the catalyst. Suitable examples of such materials include silver, stainless steels, aluminum, tin, lead, glass, and enamel. Ordinary steel is often found to be unsuitable unless it has been "conditioned" by pickling with dilute peroxide solutions, by conducting a peroxide-catalyzed reaction therein, or sometimes by highly polishing the surfaces to a mirror finish.

When the process of this invention involves a reaction of a heterogeneous system it is desirable to maintain all reactants in intimate contact by agitation. The agitation may be applied in any manner, for example, by vigorous stirring, by turbulent flow in a tubular reactor, by efficient bubbling of the gas phase through the liquid phase, or by any other means which will accomplish this end.

Although the illustrative examples given above relate to a batch operation, the process may also be conducted in a continuous manner. Continuous operation provides for great ease of temperature control. The ethylene reactions of this invention are highly exothermic, and when relatively small masses of reactants are processed per unit of space in the reaction system, relatively small quantities of heat are evolved. This improved temperature control minimizes degradation of the pre-existing polymer and makes for more accurate control of the degree of modification by ethylene. Furthermore, the high space-time yield of a continuous unit makes the process more economical because of the relatively small capital investment involved, and also because of elimination of "stand-by time" for cleaning, unloading and other such operations.

The term "polymer" as used in the description and claims refers to macromolecular materials having a plurality of recurring units.

We claim:

1. A process for modification of cellulose esters which comprises heating a cellulose ester in a solvent with ethylene under a pressure within the range of about 750 to 965 atmospheres at a temperature in the range of about 50° to 150° C. in the presence of a catalytic amount of a free radical producing compound, whereby an ethylene-modified cellulose ester, characterized by decreased compatibility with organic solvents, is obtained.

2. A process for modification of vinyl ester polymers which comprises heating a pre-existing vinyl ester macromolecular polymer in a solvent with ethylene under a pressure within the range of about 550 to 1000 atmospheres at a temperature of about 50° to 150° C. in the presence of a catalytic amount of a free radical producing compound, whereby an ethylene-modified vinyl ester macromolecular polymer, having a lower saponification value than the unmodified polyvinyl ester is obtained.

3. A process for modification of a synthetic linear polyamide having recurring carbonamide groups as an integral part of the main polymer chain which comprises heating a synthetic macromolecular linear polyamide with ethylene under a pressure of about 500 to 1500 atmospheres at a temperature of about 50° to 150° C. in the presence of a catalytic amount of a peroxy compound whereby an ethylene-modified synthetic linear polyamide is obtained.

4. The product obtained in accordance with the process which comprises subjecting a cellulose ester to reaction with ethylene at a temperature within the range of about 30° to 400° C. under a pressure of from 1 to 3000 atmospheres in the presence of a catalytic quantity of free radical producing compound, whereby ethylene becomes chemically combined with the said cellulose ester, and thereafter separating the modified cellulose ester from the resultant mixture.

5. The product obtained in accordance with the process which comprises subjecting a synthetic macromolecular linear polyamide having recurring carbonamide groups as an integral part of the main polymer chain to reaction with ethylene at a temperature within the range of about 30° to 400° C. under a pressure of from 1 to 3000 atmospheres in the presence of a catalytic quantity of free radical producing compound, whereby ethylene becomes chemically combined with the said synthetic linear polyamide and thereafter separating the modified synthetic linear polyamide from the resultant mixture.

6. The product obtained in accordance with the process which comprises subjecting a vinyl ester macromolecular polymer to reaction with ethylene at a temperature within the range of about 30° to 400° C. under a pressure of from 1 to 3000 atmospheres in the presence of a catalytic quantity of free radical producing compound, whereby ethylene becomes chemically combined with the said vinyl ester macromolecular polymer and thereafter separating the modified vinyl ester macromolecular polymer from the resultant mixture.

7. A process for the modification of pre-existing macromolecular polymeric materials which comprises subjecting a pre-existing polymeric material of the class consisting of linear polymeric esters, linear polymeric ethers, linear halogenated hydrocarbon polymers and linear polyamides having recurring carbonamide groups as an integral part of the main polymer chain to reaction with ethylene under superatmospheric pressure in the presence of a catalytic quantity of a free radical producing compound as a catalyst whereby ethylene becomes chemically combined with the said pre-existing polymer.

8. A process for the preparation of ethylene-modified polymers which comprises subjecting a pre-existing macromolecular polymeric material of the class consisting of linear polymeric esters, linear polymeric ethers, linear halogenated hydrocarbon polymers and linear polyamides having recurring carbonamide groups as an integral part of the main polymer chain to reaction with ethylene at a temperature within the range of about 30° to 400° C. under a pressure of from 1 to 3000 atmospheres in the presence of a catalytic quantity of free radical producing compound, whereby ethylene becomes chemically combined with the said pre-existing polymer.

9. A process for the modification of polymeric materials which comprises heating a pre-existing macromolecular polymeric material of the class consisting of linear polymeric esters, linear polymeric ethers, linear halogenated hydrocarbon polymers and synthetic linear polyamides having recurring carbonamide groups as an integral part of the main polymer chain with ethylene at a temperature within the range of about 50° to 250° C. under a pressure of about 500 to 1500 atmospheres in the presence of a catalytic quantity of a free radical producing compound, whereby ethylene units become attached to the pre-existing polymeric material.

10. A process for the modification of polymeric materials which comprises heating a macromolecular polymeric material of the class consisting of linear polymeric esters, linear polymeric ethers, linear halogenated hydrocarbon polymers and synthetic linear polyamides having recurring carbonamide groups as an integral part of the main polymer chain with ethylene containing less than 1000 parts per million of oxygen at a temperature within the range of 50° to 250° C. under a pressure within the range of 500 to 1500 atmospheres in the presence of a catalytic quantity of a free radical producing compound whereby ethylene units become attached to the pre-existing polymeric material.

11. The process set forth in claim 10 in which the said pre-existing polymeric material is a cellulose ester.

12. The process set forth in claim 10, in which the said pre-existing polymeric material is a synthetic linear polyamide having recurring carbonamide groups as an integral part of the main polymer chain.

13. The process set forth in claim 10, in which the pre-existing polymeric material is a vinyl ester polymer.

14. An organic polymeric material modified by polyethylene chains chemically bound thereto and forming an integral part thereof, said modified polymer being obtained by the process of claim 10.

WILLIAM E. HANFORD.
JOHN R. ROLAND.

REFERENCES CITED

The following references are of record in the file of this patent:

UNITED STATES PATENTS

| Number | Name | Date |
|---|---|---|
| 2,200,429 | Perrin et al. | May 14, 1940 |
| 2,405,950 | Hanford | Aug. 20, 1946 |
| 2,409,683 | Howk et al. | Oct. 22, 1946 |
| 2,440,800 | Hanford et al. | May 4, 1948 |

OTHER REFERENCES

Russell et al., pp. 183–189, Ind. and Eng. Chem., Feb. 1938.